United States Patent
Powell et al.

(10) Patent No.: US 6,990,504 B2
(45) Date of Patent: Jan. 24, 2006

(54) METHOD AND SYSTEM FOR TRANSMITTING SECURED ELECTRONIC DOCUMENTS

(75) Inventors: Dallas H. Powell, Orem, UT (US); Bruce L Walters, Highland, UT (US); Kerry R. Ward, Provo, UT (US)

(73) Assignee: Tybera Development Group, Inc., Orem, UT (US)

(*) Notice: Subject to any disclaimer, the term of this patent is extended or adjusted under 35 U.S.C. 154(b) by 84 days.

(21) Appl. No.: 10/274,059

(22) Filed: Oct. 18, 2002

(65) Prior Publication Data

US 2004/0078394 A1 Apr. 22, 2004

(51) Int. Cl.
*G06F 17/30* (2006.01)

(52) U.S. Cl. ............ 707/200; 707/10; 707/104.1; 709/228

(58) Field of Classification Search ............ 707/10, 707/104.1, 200; 709/228, 229, 206, 230, 709/237; 713/200, 201, 176; 705/35
See application file for complete search history.

(56) References Cited

U.S. PATENT DOCUMENTS

| | | | |
|---|---|---|---|
| 2002/0049853 A1 * | 4/2002 | Chu et al. | 709/237 |
| 2002/0116508 A1 * | 8/2002 | Khan et al. | 709/229 |
| 2002/0138735 A1 * | 9/2002 | Felt et al. | 713/176 |
| 2003/0040997 A1 * | 2/2003 | Rousseau et al. | 705/35 |
| 2004/0015596 A1 * | 1/2004 | Sapuram et al. | 709/230 |

* cited by examiner

*Primary Examiner*—Charles Rones
*Assistant Examiner*—Hassan Mahmoudi
(74) *Attorney, Agent, or Firm*—Christensen O'Connor Johnson Kindness PLLC

(57) ABSTRACT

A system and method of filing documents electronically or otherwise where the documents are secured from modification. The security provides proof that the items to be submitted have remained unchanged since the encryption was applied. A first installation account within a first installation is created, the first installation account having second installation account information relating to a second installation. A user account is stored in the first installation having information stored therein for a user of the second installation. A submission envelope is secured using a digital signature from the first installation, and this submission envelope is stored in the first installation.

5 Claims, 5 Drawing Sheets

SUBMISSION ENVELOPE

E2 RECEIPT ENVELOPE WITH
E1 ENVELOPE SUBMISSION DIGITAL DIGEST

METHOD AND SYSTEM FOR TRANSMITTING SECURED ELECTRONIC DOCUMENTS

FIELD OF THE INVENTION

This invention relates, in general to the manner in which electronic documents are transmitted and received, and more specifically, to an account management method where user accounts may be distributed across multiple servers and the responsibility to manage the users is distributed to multiple organizations. Account information is embedded within the content of each transmission and used for authentication of source and protection of the integrity of the content within the transmission.

BACKGROUND OF THE INVENTION

Developments through the internet and electronic or wireless transmission move more and more towards the elimination of paper documents, where possible, to paperless systems. There are significant reasons for parties to move from the hassle of paper documents to electronic documents.

One important reason parties are moving towards electronic document filing and transmission is it allows elimination of massive storage facilities. The information that used to require large complexes of storage cabinets for paper documents and files can now be stored electronically, readily categorized, searched and easily retrieved. Personnel that used to be required for extensive filing and retrieving systems can now be reduced since in large measure the information can be stored on a networked computer system and easily accessed by the user from the convenience of their own personal computer.

Another reason parties are moving towards electronic document filing and transmission is the use of electronic documents allows automation of many manually intensive processes. When information is exchanged in paper format that needs to be maintained in a database, significant time and effort is required to translate the information from paper into the database. Transmitting information electronically allows some of these processes to be automated.

It is well known that documents can be readily transmitted electronically. This has become common place through the use of email, ftp, http, and other methods. Further, secure transmission of such documents has also become common place using encryption technology. However, in spite of the extensive use of electronic transmission of documents, even with secure encryption layers of communication, various groups, such as the legal courts and government agencies, have been slow to implement processes for accepting the filing of documents from one or more parties. In these cases, the courts and agencies or other similar receiving parties are concerned with the preservation of the documents, the long term ability to insure that the documents are not changed, document integrity during transmission, the authenticity of the documents, and the management process that allows some parties to transmit documents while disallowing other parties.

There have been various attempts in the industry to establish methods of electronically preparing documents, and submitting them to receiving organizations. Frequently this process is referred to as e-filing. Usually because a single vendor controls the preparation and transmission, as well as the receiving process, user authentication, document integrity, and long term protection of evidence are managed through closed processes. Courts and government agencies have piloted various strategies with single vendor control, and yet almost all of these pilots have failed to gain significant user adoption for various reasons. In addition, previous test pilots have not been able to provide a system that embeds into the content of the transmission the authentication of source, document integrity and evidence protection that can be shared in an open environment yet remain secure. Also the practicality of scaling an open process of user account management to tens of thousands of accounts, distributed across thousands of servers that support the authentication and document integrity has been difficult to achieve.

Accordingly, a method that provides a process for managing organization and user accounts that embeds authorization information into the content of the transmission, which can be distributed across multiple installations, supports document integrity, and assures long term protection of evidence, is needed.

SUMMARY OF THE INVENTION

A system and method of electronically filing documents which are secured from modification provided according to the present invention, the security providing proof that the items submitted have remained unchanged since being secured. A first installation account within a first installation is created, the first installation account having second installation account information relating to a second installation. A user account is stored in the first installation having information stored therein for a user of the second installation. A submission envelope is secured using a digital signature from the first installation, and this submission envelope is stored in the first installation.

DETAILED DESCRIPTION OF THE INVENTION

Figure 1:
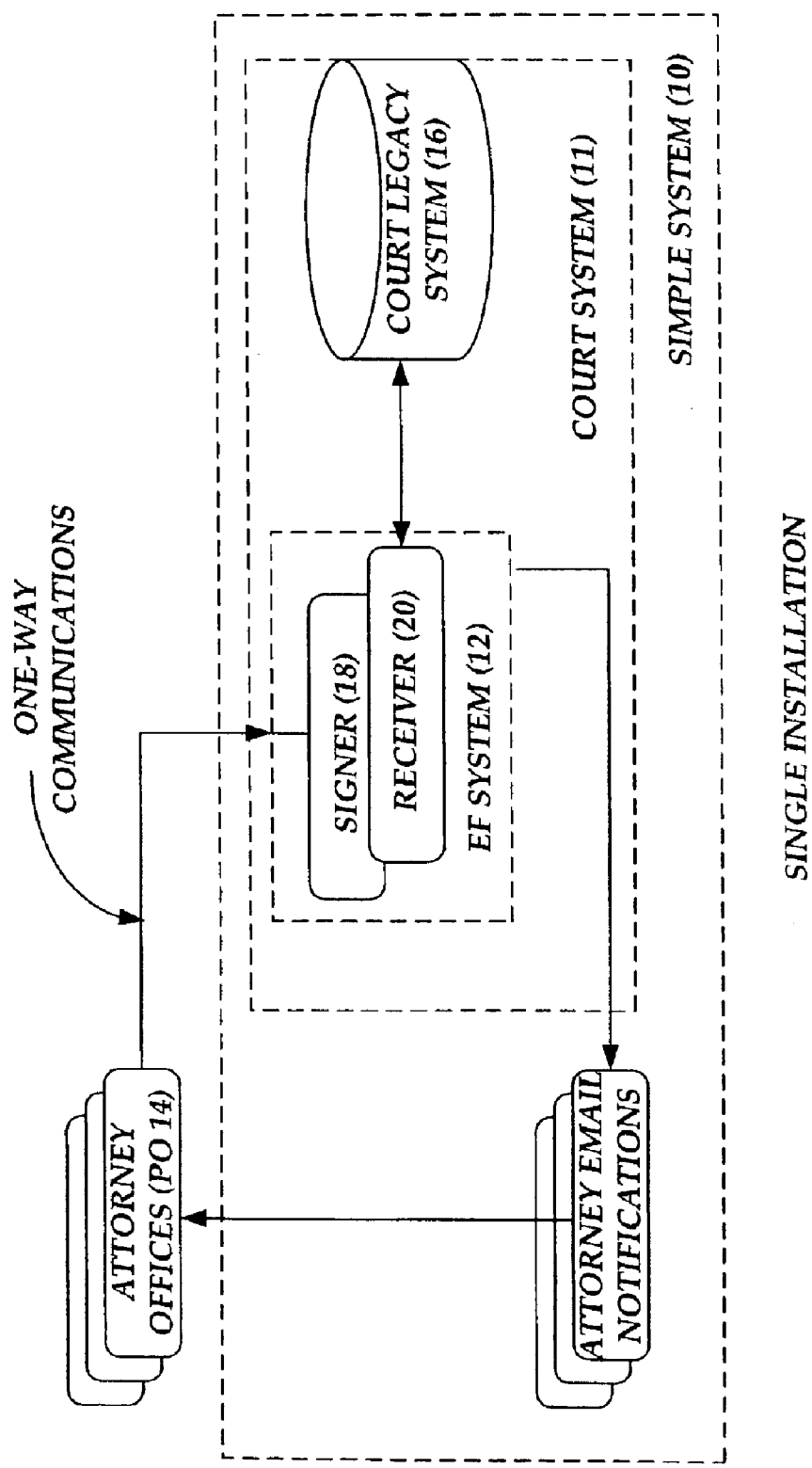
FIG. 1 is a diagram of a simple filing process according to a preferred embodiment of the present invention.

It should be understood that the terms "electronic" and "electronically" as used throughout the Detailed Description of the Invention for the preferred embodiment applies equally to wireless and other types of transmission. Thus, the principles and applications of the present invention are not limited to situations where the information, files, etc., are transmitted by movement of electrons through a set medium. Rather, they apply equally and broadly to all other mediums of transmission including but not limited to wireless (air waves) transmissions and transmissions using light as a transmitter such as through fiber optics. For ease of explanation, electronic filing and electronics transmission will be described throughout the Detailed Description of the Invention where the preferred embodiment contemplates the use of the internet as the transmission element. However, all other means of communication/transmission are contemplated.

Electronic filing, for purposes of explaining the preferred embodiment, shall be defined as submitting documents to a receiving party such as a court or government agency, having one or more submitting parties digitally "sign" or approve the documents, and then transmitting the documents with the signatures or approval to a receiver. In addition, a receipt created by the receiving installation is returned to the sender. This process has application in a large variety of uses such as submitting documents (motions, briefs, complaints, etc.) from attorneys to the courts as well as responses and rulings from the courts to the attorneys. The process could also include submitting forms and applications to a government agency such as a patent application to the patent office, or even executing agreements between parties residing considerable distances apart yet requiring immediate turn-around time. Certainly numerous other applications can be readily discerned through thoughtful and/or creative contemplation. What is critical to the application or filing process is how to manage thousands of user accounts across multiple organizations so that each submission can be verified that it came from a source that is authorized. In addition, the integrity of the document must be verified after transmission is complete. When the information is stored as evidence for long periods of time, or shared and replicated multiple times by multiple organizations, any party equipped with the proper software must be able to verify that the content has not changed. If the content of the submission can be changed or any portion of the transmission can be modified, the documents as filed, and evidence stored, will not have the force of being a legally binding document.

The present invention, as described below, provides an account management process which includes the sharing of public keys from server certificates. The private key installed on the server is used to digitally sign the content and embeds the signature with the content of the transmission providing an authentication process and document integrity within the message. The method of the present invention also includes a receipt generated by the receiving unit that is returned to the sending party that binds the receipt to the submission. Through the present invention multiple parties can be bound together, through signature and/or receipt, and each party is able to maintain a legally binding copy of the evidence. The present invention further teaches the implementation of the functions listed above in a manner that is fully managed to allow multiple levels of users with a distribution to thousands of accounts.

For clarity, certain terms utilized in describing the present invention are outlined below.

A document is any file or information that can be stored on a computer file system or information that is stored in memory on a computer.

Type A—This can be any type of document or format or file of information. "A" stands for ANY. Frequently documents used in this category are MS Word, WordPerfect, Adobe PDF, CAD drawings, Spreadsheet data, Binary Large Objects "BLOBS", etc.

Type C—This is a Public certificate that is issued by a public key Infrastructure. Asymmetric key pairs use private and public keys. A Public certificate includes a public key but not a private key. The C stands for certificate.

Type C1—This is a public certificate issued to an individual.

Type C2—This is a public certificate issued to an organization, not to be used by an individual but by an organization for use on a computer server such as a web server. The certificate represents a company or organization that controls the server where the certificate is installed.

Type D—This is a digital digest of a given document. A digital digest is a unique binary sequence of digits generated as the output of an algorithm, where the input is a Type A document or a stream of information such as multiple, documents The "D" stands for Digest.

Type E—This is an electronic envelope and can be used for submitting documents electronically. An electronic envelope is an electronic storage format where Type A documents can be stored in and retrieved from the envelope. When a document is stored and then retrieved the document is restored to its original binary sequence. Zip and Tar files are defacto formats for electronic envelopes. Recently XML documents have been used to envelop other documents. In order to envelop a Type A document within an XML document, it is a common practice for the Type A document to be base64 encoded. Base64 encoding is a conversion process that translates binary data to a limited ACSII character set. The "E" stands for Envelope.

Type I—This is an electronic image of an individual's signature. The image may have been scanned into the computer from an image on paper. The "I" stands for Image.

Type P—This is a Private Key that is issued by a public key Infrastructure. Asymmetric key pairs use private and public keys. A Private Key is used as part of the input into an algorithm for creating a digital signature. The "P" stands for Private Key.

Type P1—This is a Private Key that is issued by a public key Infrastructure to an individual.

Type P2—This is a Private Key that is issued by a public key Infrastructure to an organization to be used on a server installation such as a web server and not used by an individual.

Type S—This is a digital signature. A digital signature is the output of an algorithm that takes two inputs, a Type P private key, and a Type D document. The digital signature is an electronic encrypted data string, a unique binary sequence of digits created by encrypting a Type D document using the Type P private key. The S stands for signature.

Type S1—This is a digital signature that represents the signature of an individual using a Type P1 input and a Type D digest.

Type S2—This is a digital signature that represents the signature created by a server such as the web server of a company or organization using a Type P2 input and a Type D digest.

Type X—All Type X files are data that are XML documents, SGML documents, or some structured form of information where a name and a value can be paired. The "X" stands for XML.

Types X1—These files are for automation processing used by both processes of the present invention and external processes. These types of documents frequently have a Document Type Definition "DTD" or Schemas associated with them.

Types X2—These files are for automation processing but are for internal use and may not have DTD or Schemas associated with them. They contain control data that include the user or system that created the submission, login information, time, and, date stamps, and other internal processing information.

Signer administrator—an administrator of a signer component. The administrator creates organization and user accounts on a signer component. The administrator creates both internal staff accounts and external organization accounts of Type OT-1 and OT-2.

Receiver administrator—an administrator that defines which organization accounts of type OT-1 and OT-2 are authorized to send submissions to the specific receiver component. The administrator can define what specific type of filing each organization can submit.

Account type OT-1—organizations that contain administrative account and user accounts. All accounts of this type will use the installation on which this account is created to create and send submissions.

Account type OT-2—organizations that contain an administrative account but NO other user accounts. All accounts of this type will create and send submissions from a different installation where they have an account type OT-1.

Organizational administrator for an account of type OT-1—an administrator from the external organization who logs-in, modifies profile information of his company, and creates, modifies, or deletes user accounts for all users from his organization. The users created under an OT-1 account do not have a signer and receiver component installed at their organization and must use an external signer component to create and send submissions.

Organizational administrator for an account of type OT-2—an administrator that only has organizational information and no user accounts because the users create and send submissions from a different installation. The administrator loads a Type C2 public certificate in the profile along with an IP address and organizational information. The public certificate is paired to the Type P2 private server key installed on the signer component of the IP address defined in the account, where the users of his organization will login, create and submit submissions.

Verification of a signature—The verification of a digital signature Type S is based on a process using encryption, decryption and comparisons of Type D digital digests. A digital digest Type D can be created multiple times without affecting the verification process (with the same results). A digital signature is the encryption of the digital digest of a document using a private key Type P. To verify a digital signature of a document a second digest is created. The public key embedded in the public certificate Type C that is the pair to the private key Type P used to encrypt the digital digest decrypts the signature leaving a digital digest. A second digital digest is created from the documents contained in the electronic envelope used to submit filing information. This newly created digital digest is compared to the digest that is the result of the decryption. If the two digests match, then the digital signature is verified.

Asymmetric key pair encryption—There are times when certain items with a document, such as the credit card number and expiration date should be secured from unauthorized access. In the case of the present invention, credit card numbers and expiration dates will be the content of certain elements within Type X—XML documents. The information must be secured from unauthorized access. In order to secure fields of data in Type X documents, the present invention uses asymmetric key pair encryption. This process requires a receiving party to publish their C2 server public certificate to all parties that wish to send data of this nature secured. The sending party uses the public key of the receiving party to encrypt the Type X content of a given element. In order to embed the encrypted information into an XML document the encrypted data must be base64 encoded. The receiving party then uses their P2 private server key to decrypt the secured fields. This means that anyone that wants to access the information must first gain access to the Type X document, un-encode the base64 field, access the private key installed on the receiving server, and decrypt the field before they can access the plain encoding of the information. The information that each sending installation downloads from the receiving party includes information about each filing that they are authorized to send. Included in this data will be the public key of the receiving party to secure data where necessary.

For purposes of simplicity, the preferred embodiment of the present invention will be described below in the context of a court communication, such as an attorney's office submitting motions or other filings to the court and the court's responses and actions. It should be recognized that this is only one application for the present invention and that the present invention can be utilized in many ways and by varied parties. For instance, attorney's offices and courts are described below, but any company, government, association or even individuals can be considered for any of the parties. Electronic submission of documents or other submissions that need evidence of who it came from included in the submission, verification that the source is an authorized source to send submissions, evidence that the submissions have not been altered during transmission or after being saved in an electronic archive, and evidence linking a receipt to the submission in a managed manner to accommodate large numbers of users at multiple levels is one goal of the present invention, and the implementations and applications of the present invention are very broad and varied.

Account Setup Process for a Simple Filing System

FIG. 1 shows a flow diagram for a simple filing system 10 where a court 11 has installed an electronic filing (EF) system, or installation, 12 utilizing the present invention to allow participants such as internal staff or external organizations (PO) 14 to file legal papers with court 11 which are then utilized in a legacy system 16 of court 11. It must be recognized that for ease of description a court and legal filings are specified. However, court 11 could be any receiving entity or unit, not necessarily a court, and PO 14 could be any submitting entity, including an individual. For instance, element 11, rather than a "court" 11, could be an electronic account management system or clearing house which receives purchase documents and credit card information for sales transactions from a purchaser (PO 14). Any type of receiver or submitter is contemplated under the principles and description of the present invention.

EF system 12 incorporates two basic components, a signer component 18 and a receiver component 20 at the court. A signer administrator operating the signer component 18 of EF system 12 will create organizational accounts of type OT-1 for each PO 14 installation that will use the signer component 18 of EF system 12 to create and transfer submissions. Until other signer and receiver components or installations are installed at other locations this installation will only configure organizational accounts of Type OT-I. Each OT-1 account will include an organizational administrator account managed by the organizational administrator of the organization (PO 14) represented by the OT-1 account. This administrator account will include a username and password and information about the organization. The signer administrator will share the newly created username and password with the organizational administrator of the specific PO 14 for whom the OT-1 account was created. A receiver administrator operating the receiver component 20 of EF system 12 will define what filing types each organization account of both OT-1 and OT-2 accounts can submit to the receiver component 20.

The organizational administrator of each OT-1 account at PO 14 logs into the EF system 12 at the court 11 and creates user accounts for each user in the respective PO 14 organization. These users will create and send electronic filing submissions to the receiver component 20 of EF system 12 through the signer component 18 of EF system 12. The user accounts will generally include a username, password, private keys, credit card information, and information specific to the types of filings their OT-1 account is authorized to submit.

Filing Process for a Simple Filing System

The process of filing will now be explained in detail for the simple filing system 10 of FIG. 1 in conjunction with the diagrams of FIG. 2 and FIG. 3.

The users of each type OT-1 account at PO 14 will login to the signer component 18 of EF system 12. The user(s) first selects and configures user information and defines the types of filing the user wants to create. This information is stored permanently in the user account information. The user also can store private keys in the user account information and associate the keys to a specific type of filing.

Second, once the user information is established, the user with PO 14 desiring to file a filing with court 11 will prepare a document 110 (FIG. 2) which will be a Type A document. As explained above, Type A documents can be of any form. For instance, document 110 may began agreement prepared electronically in a word processing format. Further, more than one Type A document can be submitted in a single filing. A type X1 document 112 representing automation data for document 110 is then generated. The information in the X1 document is dependent upon the type of filing being created and includes user information. This user information may include, for legal filings with a court, the attorney bar number, the type of filing such as a civil case complaint for a bad debt, the specific court location identifier, the amount of the complaint, the filing fee, and credit card information. The information in the X1 document 112 is automation information that the receiver component 20 requires to automate the processes that will be effected by the submission. In this example the X1 automation information is required to initiate a case in the legacy system 16 (such as the legacy case management system and document management system). A type X2 document 118 representing control data for a submission envelope 120 is also generated. In the preferred embodiment, X2 document 118 is XML control data.

Submission envelope 120 is the "packaging" or envelope for the contents required for a specific type of submission. For purposes of the preferred embodiment, submission envelope 120 is an electronic envelope. However, it will be recognized that any medium of transmission, including by not limited to wireless (air waves) and light waves through fiber optics, is also contemplated by the principles and teachings of the present invention. In the case of a legal filing, document 110 would be some type of form, brief, complaint etc. Within submission envelope 120 then, document 110 would be packaged with the X1 112 document to allow initiation with legacy system 16 and other elements as described below. In the case of other types of electronic submission, X1 document 112 will be a facilitator for communication within the receiving unit 11. Various types of files, including documents, photos, or any other type of file, are all contemplated as included within the scope of document 110.

The X2 document is created based on information supplied by the user account and system information. The information includes signer component 18 specific information, the IP address the submission will be sent from, the IP address the submission will be sent to, login time of the user, the creation date of the submission, and data to track the specific envelope so that status information can be associated with each submission. The X2 document 118 also includes and is continually updated with information for the sequencing order of all information in the envelope. This sequence defines the order all documents, signatures, and other data will be processed to create a server based digital signature. As mentioned previously with regard to the Verification of a signature, the files of information and documents contained in submission envelope 120 are processed through an algorithm to form a check sum or digital digest. To this digital digest a private key Type P is applied. Thus, when the verification occurs, the receiving end uses the same algorithm and contents in the submission envelope 120 according to the order dictated by the X2 document 118 to create a new digital digest. Also, the digital signature is decrypted using the Public key associated with the encrypting private key to recreate the original digital digest. The two digital digests are compared and if they are identical, security verification has occurred. Thus, a server based signature 122 (digital signature) is the agent used to secure submission envelope 120 and verify that no information is added, deleted, or modified within the submission during transmission or after the submission is archived as evidence. The server based signature 122 is included in the envelope but not part of the sequence of information in X2 document 118. As explained subsequently, server based signature 122 is applied after all documents and signatures for submission have been received at signer component 18.

At this point of the process, document 110 can be posted along with X1 document 112 and X2 document 118 to a specified holding location where one or more people apply their individual signature 114 to the content. In the case of a legal filing, signer component 18 of EF system 12 can act as the holding location. Each party signing must sign using their private key Type P1 which generates a digital signature 114 for the signing party. It should be understood that each digital signature 114 has an associated individual public certificate 116 assigned to it. In addition, the server signature 122 has a server public certificate 124 associated with it. Accordingly, each digital signature 114 and 122 will have public certificates 116 and 124 included in the submission.

It may be that an individual signing or executing document 110 does not have a registered digital signature 114/ public certificate 116. In such a case, a Type I image, or digital image, representing that party's signature can be generated and posted. However, such a digital image cannot be used to prove that the individual actually signed document 110, nor can it be used to check to see if there is any modification to document 110 after posting the individual signature. Individual digital signatures 114 can be used as proof that the individual actually signed document 110 and any modifications to document 110 can be confirmed when digital signatures 114 are used. The process of using a Type I image in essence says that no signature exists that can be validated electronically against a person and document 110. To add support and credibility to a Type I image signature, and to further buttress the strength of digital signature 114, information is included in a submission, whether digitally signed or not by an individual, to show when a person logged in to a secure server, when the submission was created, and when the submission was approved for submission to EF system 12. This creates a trail of evidence to show that someone unique logged into EF system 12 and went through the process of creating, posting, agreeing and transmitting a submission, and the particular server used to login. Such information is included in X2 document 118.

With document 110 posted with X1 data 112, S1 digital signatures 114 and public certificates 116 for each individual collected, and an X2 document 118 generated, submission envelope 120 is generated. Submission envelope 120 in essence incorporates document 110, X1 data 112, S1 individual digital signatures 114 and C1 certificates 116, and X2 document 118 into a single electronic file. A Type S2 server signature 122 is created using a server private key Type P2. A Type C2 server public certificate 124 is included in the submission envelope. The S2 server signature 122 locks or secures the content in the submission envelope 120 so that no additions, deletions, or modifications can be made to any of the submission.

It can be readily understood from the simple explanation above that one of the strengths of the present invention is that when S2 server signature 122 is created no information within submission envelope 120 can be tampered with. If the users use images or authentication information rather than S1 digital signatures the submission is still protected from being tampered with in any way by being locked into submission envelope 120 by S2 server signature 122. With submission envelope 120 now generated by signer component 18, all the contents are stored in submission envelope 120 and the submission is sent to receiver component 20 of EF system 12.

When receiver component 20 receives a submission S2 server signature 122 operates to supply verification of content integrity and verification that the submission came from an authorized source. The process for receiving submissions is as follows.

First, the IP address stored in X2 document 118 is checked to determine the submitting server coincides with the, OT-1 account on the EF system 12 where the submission is received. All OT-1 accounts of a single installation are associated with the same IP address and the same private and public key installed on the EF system 12 where the OT-1 accounts were created. The C2 public certificate stored on the signer/receiver components 18 and 20 of EF 12 is retrieved. This C2 public certificate (EFPC) installed on the EF system 12 is, or should be, the same as C2 124, the public certificate stored in the submission created by the users of PO 14, OT-1 account on the EF system 12. The EFPC is then compared with C2 124 in the submission envelope 120. If the certificates are the same then the account is verified as an authentic source. If the verification of signature process (defined previously) of the content in submission envelope 120 using the S2 signature 122 validates using the C2 124 public key for decryption then the content integrity is verified. Upon verification, the complete submission envelope 120 with its contents is stored as long term evidence.

A receipt 205 is generated by receiver 20 depending on the type of submission and any custom rules for each installation. Even when the content of the receipt uses custom rules, the receipt must still have an undisputable link to the submission. As an example, FIG. 3 demonstrates a receipt 205 that includes Type A receipt information (210). The receipt further includes C2 public certificate 224, S2 signature 222 of EF 12, Type A receipt 210, X2 control data 218 which lists documents and files contained in the receipt 205, and a D2 digest 226 of the original submission. In order to bind the receipt to the original submission content, the entire content of the original or at least the D2 digital digest (226) of the original submission as shown in FIG. 3, should be included in the receipt. The S2 signature 222 locks the receipt envelope which includes a digital digest of the original submission so that nothing in the envelope can be altered, similar to the case with the locking of the original submission. One having ordinary skill in the art will recognize that the digital digest is unique to the original submission and undisputedly binds the receipt to the submission.

In the preferred embodiment of the single installation scenario, receipt 205 is returned to PO 14 through email, as well as through the OT-1 user account, although all other methods of sending electronic receipt 205 and non-electronic receipts are contemplated by the present invention. Additionally, information related to the filing in EF12 may be communicated to personnel with court 11 through email or other means.

Multiple Installations and Distributed Authentication

So far the preferred embodiment of the present invention has been described with respect to a single installation where court 11 is the only organization having a signer/receiver installation. Another preferred embodiment of the present invention expands upon the single installation of FIG. 1 to include multiple installations. This is shown in FIG. 4.

In each installation, the signer administrator determines what type of an account each organization will use, whether an OT-1 account for organizations that will use the EF system 12 as a single installation (such as court 11 of FIG. 1), or an OT-2 account where the organization uses a different installation such as in PO 140 of a multiple installation.

Figure 4:
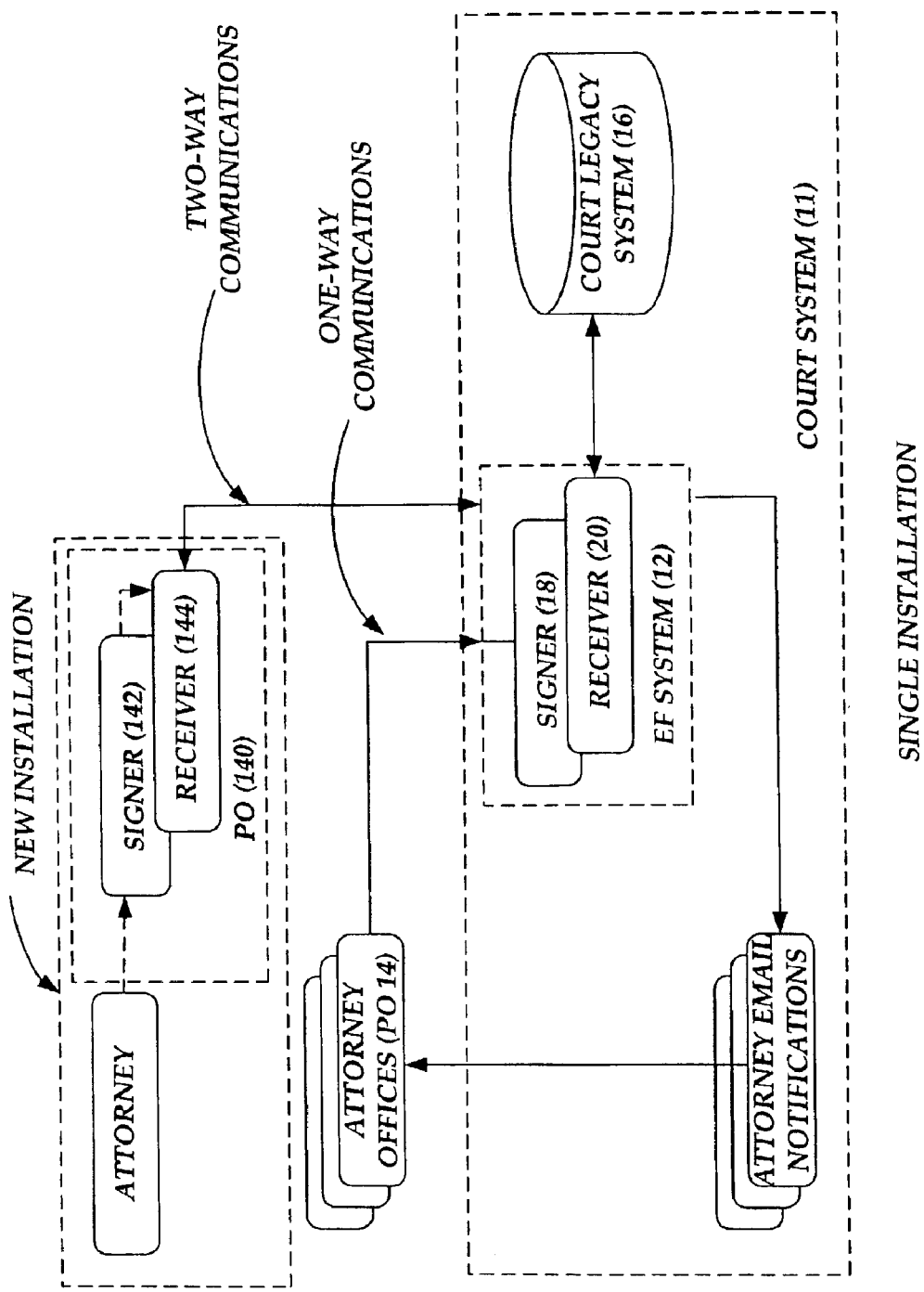
FIG. 4 is a diagram of a filing process having multiple users and multiple installations according to a preferred embodiment of the present invention.

In FIG. 4, the single installation of FIG. 1 is expanded to include a new installation PO 140 having both signer and receiver components 142 and 144 respectively. These are the same components found in EF system 12 of court 11. Where there are more than one signer/receiver installations, such as PO 140, the signer administrator of EF system 12 will create or modify accounts in EF system 12 to approve submissions from other signer/receiver installations. This is done by creating a new OT-2 organizational account in EF system 12 for the new PO 140 installation. When participating organizations install their own signer and receiver components (new s/r installations), they can transmit submissions to all installations where there is an OT-2 organizational account profile created for them. All OT-2 organizational accounts contained in the signer/receiver installations such as EF system 12, to which these new s/r installations transmit, must have an OT-2 organizational account profile as described below. Those users without their own installed signer/receiver installations, such as PO 14 of FIG. 1, continue to be supported using a OT-1 organizational account as defined in a single installation FIG. 1. All user accounts of type OT-1 can transmit submissions to other installations where there is an OT-2 account for their organization. All users on the newly expanded PO 140 installation are of type OT-1 accounts but transmit to the EF system 12 where EF system 12 contains an OT-2 organization account for their organization.

In a multiple installation, the administrator of the new installation, PO 140, will install a signer and receiver component, install a public and private key on the PO 140 server, and assign an IP address to the new installation.

Following the new installation of signer and receiver components the administrator of PO 140 will log into EF system 12 as an OT-2 organizational administrator for his organization. The OT-2 account was created for his organization by the Signer administer of EF system 12. The OT-2 organizational account administrator receives a username and password from the Signer administrator of EF system 12. Using the assigned username and password, the OT-2 organizational account administrator configures his organization profile. He does this by identifying the IP address of PO140 in EF system 12 and by loading the C2 public certificate from PO 140 into the OT-2 organization account profile found in EF system 12.

FIG. 4 shows EF system 12 supporting one PO 140 and a few PO 14 organizations, but EF system 12 can support any multiple of all types of accounts.

Figure 2:
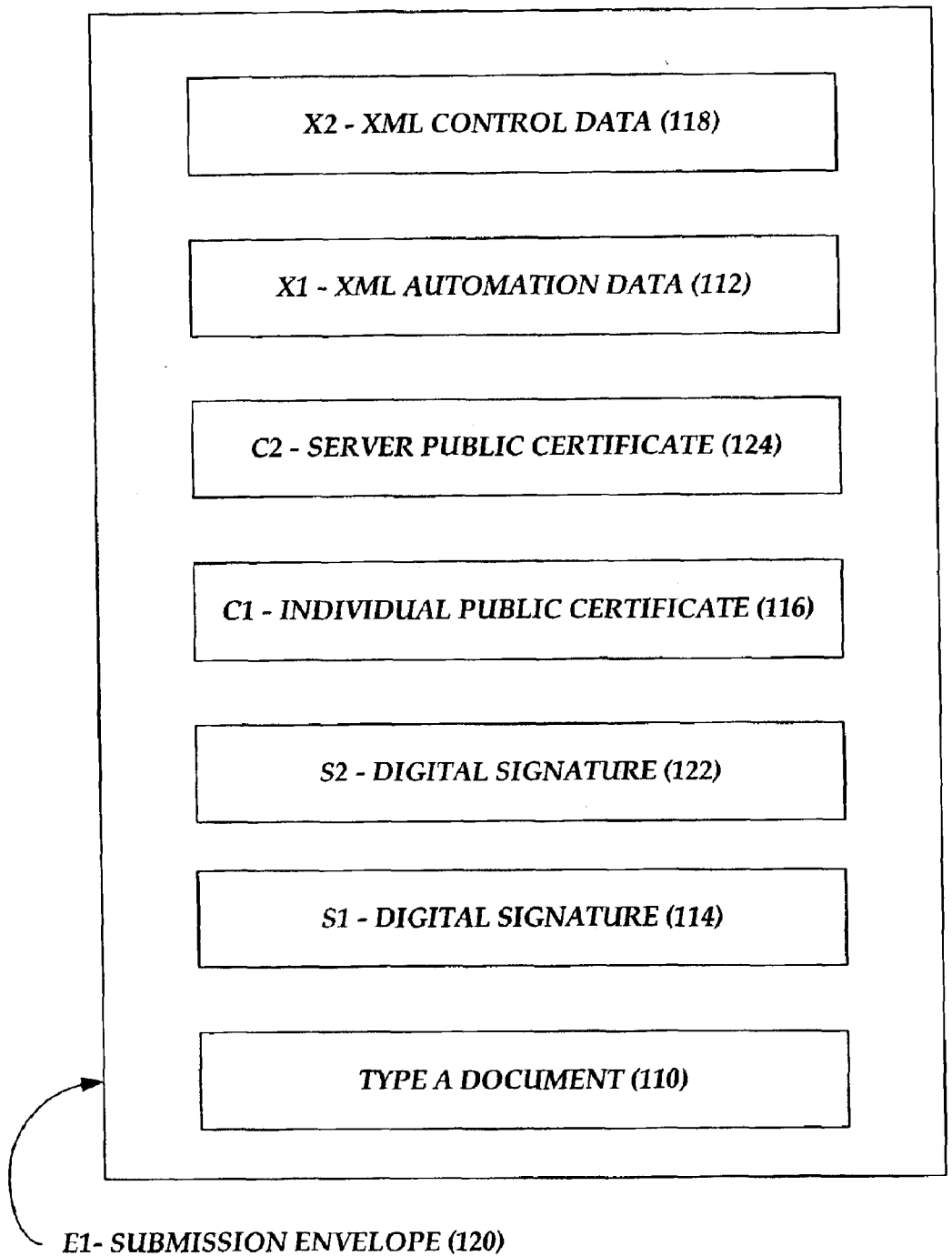
FIG. 2 is a diagram of a filing submission according to a preferred embodiment of the present invention.
Figure 3:
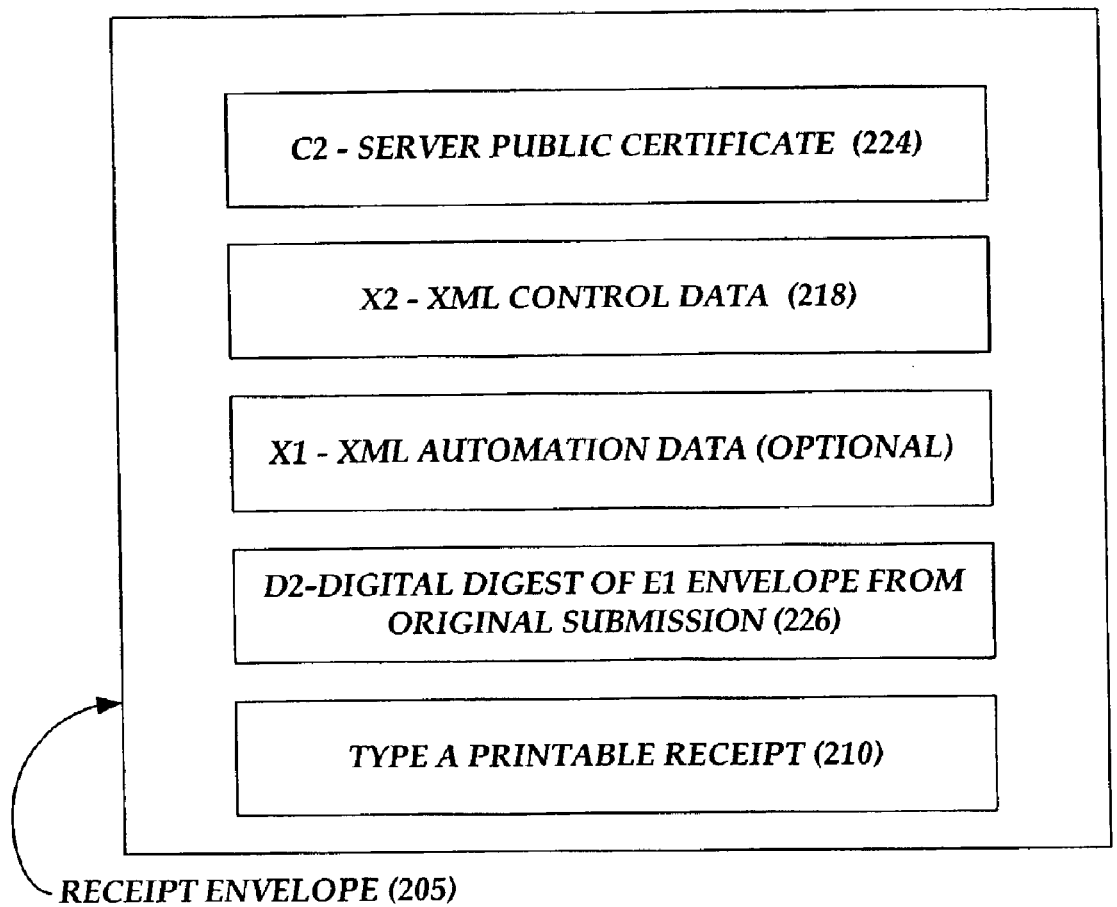
FIG. 3 is a diagram of a filing receipt according to a preferred embodiment of the present invention.

Reference is now made to FIG. 2. When PO 140 creates submissions under this type of configuration, the same information is created as was done with a single installation, but the IP address to which the submission will be transmitted will be the address of EF system 12 of court 11. The receipt generated by EF system 12 of court 11 will be the same as in FIG. 3 except that the return IP address will be that of PO140.

When the receiver component 20 of EF system 12 receives a submission from PO 140, it first checks to see if the IP address that transmitted the submission exists in an OT-2 account on EF system 12. It then verifies the S2 signature 222 using the C2 certificate 224 to make sure the signature and certificate are valid against the content of the submission. The receiver component 20 of EF system 12 then checks the C2 certificate 224 embedded in the submission from PO 140 against the Certificate stored in the OT-2 organizational account that coincides with the IP address that transmitted the submission. If the C2 certificate 224 matches the C2 public certificate in the OT-2 account the submission is then accepted as coming from a valid source and processed. In the preferred embodiment it does not matter whether the C2 certificate is compared with the OT-2 account information or the S2 signature is validated first. Either order in process results in the same conclusions.

When acknowledgements and receipts are returned to a signer/receiver installation such as PO 140, the receipts and acknowledgements are sent to receiver component 144 of PO 140 as well as through e-mail to the user that sent the submission.

When two separate installations transmit and receive from each other, the end result is that there can be two S2 signatures 222 and two C2 certificates 224 involved rather than one set. This creates a binding form of electronic evidence between two organizations as will be described below. Both organizations involved can maintain this evidence with confidence that the evidence cannot be modified.

Distributed Management and Authentication

In the single installation of FIG. 1, users of organization PO14 are authenticated through a login-password identification process to accomplish the task of creating, signing and transmitting submissions. This applies to all submissions from users of OT-1 accounts, even in the example of FIG. 4. The distribution of management begins where the Signer administrator creates the OT-1 account and the administrator of the OT-1 account creates users for his organization. Thus the management of user responsibility is distributed but the authentication of the submission is limited because all users in a single installation are using the same EF system 12. When submissions are being transmitted between multiple installations, such as PO 140 and EF system 12 in FIG. 4, distributed management and authentication is utilized.

If authentication were to occur at a user level, all known users from all entities doing business together would have to be known within each signer/receiver installation. When organizations work with many other organizations who all have signer/receiver installations, the number of names that would need to be maintained and synchronized on all installations for authentication would become too large and difficult to maintain. Therefore it becomes necessary to supply distributed management and authentication.

When multiple organizations involved in business-to-business transactions have their own signer/receiver installations, the management of users combined with the authentication of submissions requires a scalable solution. This is done by the Signer administrator creating organization names on the installation he controls for all organizations with whom he wants to do business. He will create an OT-2 account of all organizations which have their own installation, and an OT-1 account for organizations that do not have their own installation. The Organizational administrator of each account is responsible for maintaining the proper IP address and their C2 public certificates in the organizational profiles of all other installations that have authorized his company to transmit submissions by having OT-2 accounts on those systems.

The signer administrator does not need to know or record the users of an OT-2 type account. OT-2 users are configured on other installations. The signer administrator trusts that the users of other installations are controlled by the proper administrators of the other installations. Each signer administrator creating an OT-2 account for other installations must trust the signer administrators of other installations to only provide organizational administrative accounts to people trusted. The responsibility to maintain the OT-2 organizational profile information is distributed to the external organizational administrators so that when their external C2 server certificates change, or their IP addresses change, the external administrators of that OT-2 organizations will login and update their account profiles.

In the case of an OT-1 organizational account, the signer administrator creates a username and password for the OT-1 organizational administrator. The responsibility to create user accounts for each individual OT-1 organization belongs to the OT-1 organizational administrator. This means that the Signer administrator must maintain control of what organizations he is willing to do business with by creating OT-1 and OT-2 organizational accounts, but each organizational administrator will maintain either the organizational profile information or the users of their respective organization. The trust is at the organization level and the responsibility to maintain the systems is distributed among each organization for their own profiles and users.

Figure 5:
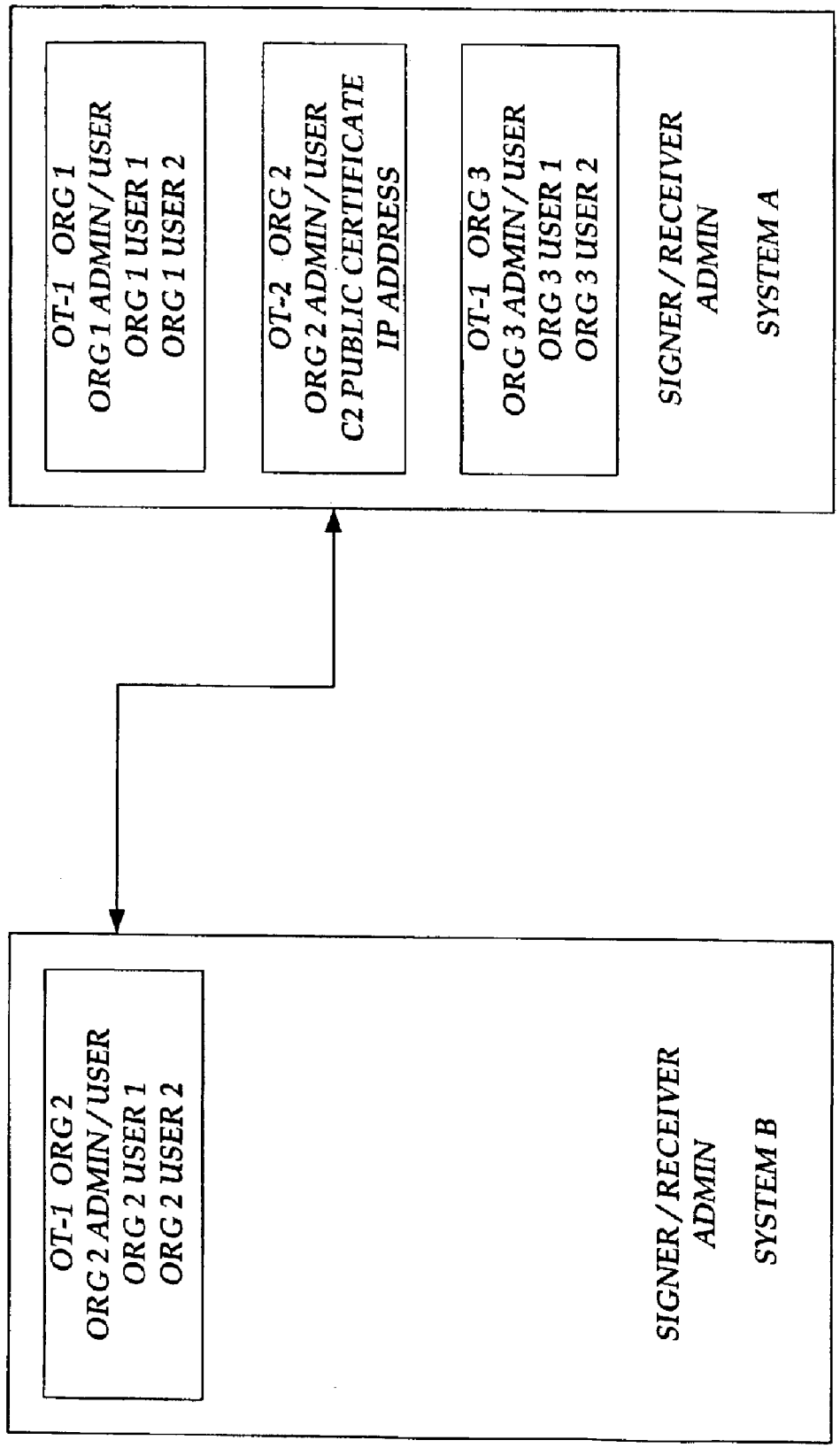
FIG. 5 is a simple diagram further explaining the operation of the present invention generally.

To clarify the account model and purposes of the accounts, reference is made to FIG. 5 where there are two installations, System A and System B and three organizations represented, Organization 1, 2, and 3. A Court is assumed to be the owner of System B and listed as Org. 1. Org. 2 is a law firm that has its own installation, System A. Org. 3 is a law firm that does not have its own installation but uses the court's installation. In this example the Court assigns who the Signer B administrator is and who the Receiver B administrator is. The Signer Administrator of System B creates an OT-1 account for the Court and calls the account Org. 1. The Signer Administrator for System B will act as the Org. 1 administrator and create Org. 1 user 1 and Org. 1 user 2 accounts. Also the Signer Administrator of System B creates an OT-1 account called Org. 3 for a Law Firm Z that does not have an installation (such as PO 14 of FIG. 4) and will use the Court's installation for filing to the Court. A person from Law Firm Z is assigned as the administrator of Org. 3. The Org. 3 administrator logs in on the Courts system B and creates Org. 3 user 1 account and Org. 3 user 2 account. The Signer Administrator of System B creates an OT-2 account called Org. 2 for Law Firm A who owns System A. A person from Law Firm A is assigned to be the Org. 2 administrator on System B. Org, 2 administrator logs in to System B and configures the OT-2 Org. 2 information with the IP address of System A and loads the public Certificate that matches the Certificate and Private key installed on System A. The Receiver Administrator for System B defines who can file to the Courts and defines that Org. 1, 2, and 3 can file to the Court. The Law Firm A that owns System A assigns who the Signer A administrator is and who the Receiver A administrator is. The Signer Administrator of System A creates an OT-1 account for Law Firm A and calls it account Org. 2. The Signer Administrator for System A will act as the Org. 2 administrator and create Org. 2 user 1 and Org. 2 user 2 accounts. With these accounts configured, all users of Org. 1, 2, and 3 can submit documents to the courts. Because the Receiver administrator of System A did not authorize anyone to transmit submissions to their installation they will only receive receipts for the transmissions the users on their system sent. They could however change this so that they could receive submissions just as the Courts do by following the same configuration.
Types of Electronic Evidence Binding Organizations Together The packaging method and the receipt method are the same for a single installation such as in FIG. 1 as it, is for multiple installations in FIG. 4. There are however some differences in the results of the binding relationships within the envelope when more than one installation are involved in a submission and receipt process.

Single Server signing—When a user creates and transmits a submission using an OT-1 account on a single installation, the submission envelope is transmitted to the same server that created the S2 signature 120 in FIG. 2. The S2 server signature 222 of the receipt in FIG. 3 is created by the same server that created the S2 signature 120 of the submission envelope. Although the envelope is digitally signed and locked by the server, the server is controlled by one Signer Administrator and the evidence is protected only by one organization.

Multi-Server signing—When a user creates a submission using an OT-1 account on system A in FIG. 5 and transmits the submission to system B in FIG. 5 the S2 120 signature on the envelope is signed by a server other than the receiving server such as the system A server. When the receipt is generated by system B in FIG. 5 and returned to system A, the S2 222 signature is again created by a server other than the one receiving the receipt (system B server). This creates a stronger model for maintaining evidence. Each installation has evidence that the installation conducted a transaction with evidence that cannot be altered.

In an example where installation A is a law firm and installation B is a court it is clear how the multiple binding process provides protection. The legal firm needs evidence that it submitted the documents to the court. A receipt from the court gives evidence that the court received the submission. To make the evidence binding, there needs to exist a binding link between the submission and the receipt. In addition, the evidence needs to demonstrate that both parties were participants of the transaction.

When an attorney from a legal firm submits a filing to a court, the installation A at the law firm signs the submission. The court has undisputable evidence that the legal firm submitted the document to the courts. The court can store that information, but it does not have access to the P2 private key installed on Server A so the ability for the court to create an altered submission is limited by the access to the server at the law firm. When the Court's installation B creates a receipt and locks the receipt with S2 signature from the Court's server the legal firm receives the receipt and has undisputable evidence that the information in the receipt was created by, the court. In addition, since the D2 digital digest of the original submission or all of the submission content is included in the receipt, the initial submission and the receipt are bound together. In this multi-server signing process undisputable evidence that each installation was involved in the transaction is included in the receipt envelope which contains an undisputable binding relationship with the original submission.

Whether digital signatures, images, or a trail of login and creation information are used to demonstrate an individual involvement in the process, the S2 signatures provide evidence that the two servers were involved in the process. This electronic evidence can now be copied and maintained by both parties, the party that created and sent the submission, and the party that received the submission and generated a receipt for the submission.

In the example of a legal firm and the court, the legal firm has trust in the evidence because the receipt includes the submission information linked to the receipt and locked by the court's S2 signature.

Thus a method and system for submitting documents electronically in a secure manner is presented by the present invention. Through the present invention proof is given to show that documents and files submitted/transmitted and stored electronically or by other communication/transmission methods have not been tampered, or had information added or removed since the documents were secured.

We claim:

1. A method for securely transmitting an electronic submission to a receiver in a distributed management system, the method comprising the steps of:

on a submission installation:
        generating a submission envelope;
        storing a file of information in the submission envelope;
        generating an envelope contents value using a predetermined envelope contents algorithm based on the contents of the submission envelope;
        digitally signing the envelope contents value thereby creating a resultant submission envelope contents digital signature;
        storing the submission envelope contents digital signature in the submission envelope;
        storing an installation identifier in the submission envelope, wherein the installation identifier uniquely identifies the submission installation to the receiver as an authorized submission installation recording to authorized installation information stored by the receiver regarding authorized submission installations; and
        submitting the submission envelope to the receiver; and
    at the receiver;
        comparing the installation identifier with in the submission envelope with the authorized installation information to determine whether the submission envelope is from an authorized submission installation;

rejecting the submission envelope if the submission installation is not an authorized submission installation;

generating a second envelope contents value using the predetermined envelope contents algorithm based on the contents of the submission envelope;

processing the submission envelope contents digital signature recording to information in the authorized installation information that corresponds to the submission installation, thereby generating a validation value;

comparing the second envelope contents value to the validation value to determine whether the submission envelope has been modified;

if the submission envelope has been modified, rejecting the submission envelope;

generating a receipt envelope including at least some portion of the submission envelope;

generating a receipt envelope contents value using a predetermined receipt envelope contents algorithm based on the contents of the receipt envelope;

digitally signing the receipt envelope contents value, thereby creating a resultant receipt envelope contents digital signature;

storing the receipt envelope contents digital signature in the receipt envelope; and returning the receipt envelope to the submission installation as evidence to the submission installation that the submission envelope was received by the receiver.

2. The method of claim 1, wherein the authorized installation information stored by the receiver regarding the submission installation includes a public key that corresponds to a private key, wherein both the public key and the private key are issued to the submission installation;

wherein the submission installation creates the submission envelope contents digital signature by digitally signing the envelope contents value using the submission installation's private key; and wherein the receiver processes the submission envelope contents digital signature according to information in the authorized installation information by decrypting the submission envelope contents digital signature using the submission installation's public key stored in the authorized installation information.

3. The method of claim 2, wherein the installation identifier is the submission installation's IP address.

4. The method of claim 3, wherein the submission installation maintains the information corresponding to the submission installation in the authorized installation information stored by the receiver.

5. A distributed file submission system for filing submissions with a receiving installation, where management of the submission accounts is distributed among the submission installations, the system comprising:

a receiver installation having an account store for storing account information for authorized submission installations;

a plurality of submission installations;

wherein the receiver installation is configured to reject all filing submissions from submission installations that are not authorized according to the account information in the account store;

wherein each submission installation is configured to become an authorized submission installation by;
   submitting a request to the receiver installation to create an account for the requesting submission installation in the account store; and
   upon receiving notification that an account was created for the requesting submission installation, storing and maintaining its submission installation information in the created account;

wherein each authorized submission installation of the plurality of submission installations makes a filing submission to the receiver installation by:
   storing filing information in a submission envelope;
   generating a submission envelope digest according to the contents of the submission envelope;
   digitally signing the submission envelope digest;
   storing the signed submission envelope digest in the submission envelope; and
   transmitting the submission envelope to the receiver installation;

wherein each authorized submission installation has been issued an asymmetric public/private key pair for encrypting and decrypting information;

wherein the submission installation stored and maintained in the account information by each authorized submission installation includes the corresponding submission installation's public key;

wherein an authorized submission installation digitally signs the submission envelope digest using the submission installation's private key;

wherein the submission installation stored and maintained in the account information by each authorized submission installation includes a submission installation identifier that uniquely identifies an authorized submission installation to the receiver installation;

wherein an authorized submission installation includes its submission installation identifier in a submission envelope; and wherein the receiver installation determines whether a filing submission is from an authorized submission installation by determining whether the submission installation identifier in the submission envelope corresponds to submission installation identifier stored in the account store.

* * * * *

UNITED STATES PATENT AND TRADEMARK OFFICE
CERTIFICATE OF CORRECTION

PATENT NO. : 6,990,504 B2  
DATED : January 24, 2006  
INVENTOR(S) : D.H. Powell et al.

It is certified that error appears in the above-identified patent and that said Letters Patent is hereby corrected as shown below:

Column 14,  
Line 57, "recording" should read -- according --.  
Line 62, "at the receiver;" should read -- at the receiver: --.

Column 16,  
Lines 10 and 53, "by;" should read -- by: --.

Signed and Sealed this

Second Day of May, 2006

JON W. DUDAS  
*Director of the United States Patent and Trademark Office*